United States Patent
Rashid et al.

(10) Patent No.: US 9,000,065 B2
(45) Date of Patent: Apr. 7, 2015

(54) POLYMERS FOR CONTACT LENSES

(75) Inventors: Abdul Rashid, Bellshill (GB); Roderick William Jonathan Bowers, Bellshill (GB); Wade Tipton, Bellshill (GB); Neil Bonnette Graham, Bellshill (GB)

(73) Assignee: Ocutec Ltd., Bellshill (GB)

( * ) Notice: Subject to any disclaimer, the term of this patent is extended or adjusted under 35 U.S.C. 154(b) by 34 days.

(21) Appl. No.: 13/505,416

(22) PCT Filed: Nov. 2, 2010

(86) PCT No.: PCT/GB2010/002020
§ 371 (c)(1),
(2), (4) Date: Aug. 10, 2012

(87) PCT Pub. No.: WO2011/055108
PCT Pub. Date: May 12, 2011

(65) Prior Publication Data
US 2012/0302661 A1 Nov. 29, 2012

(30) Foreign Application Priority Data
Nov. 6, 2009 (GB) .................................. 0919459.8

(51) Int. Cl.
| C08G 18/61 | (2006.01) |
| C08G 18/48 | (2006.01) |
| C08G 18/66 | (2006.01) |
| G02B 1/04 | (2006.01) |
| C08G 101/00 | (2006.01) |

(52) U.S. Cl.
CPC ............ C08G 18/61 (2013.01); C08G 18/4833 (2013.01); C08G 18/6674 (2013.01); G02B 1/043 (2013.01); *C08G 2101/0091* (2013.01)

(58) Field of Classification Search
None
See application file for complete search history.

(56) References Cited

U.S. PATENT DOCUMENTS

| 3,939,123 A | 2/1976 | Matthews et al. |
| 4,485,227 A | 11/1984 | Fox |
| 4,644,033 A | 2/1987 | Gnanou et al. ................. 524/590 |
| 4,780,512 A | 10/1988 | Gould et al. |
| 4,810,582 A | 3/1989 | Gould et al. |
| 4,886,700 A | 12/1989 | Younes |
| 4,886,866 A | 12/1989 | Braatz et al. .................... 528/59 |
| 4,929,706 A | 5/1990 | Heifetz et al. |
| 5,039,458 A | 8/1991 | Braatz et al. .................... 264/2.6 |
| 5,120,816 A | 6/1992 | Gould et al. |
| 6,012,471 A | 1/2000 | Calvin et al. |
| 6,673,273 B2 | 1/2004 | Le Dinh et al. |
| 6,930,196 B2 | 8/2005 | Carlson |
| 6,995,192 B2 | 2/2006 | Phelan et al. .................... 522/90 |
| 2002/0032297 A1 | 3/2002 | Carlson et al. |
| 2003/0069383 A1 | 4/2003 | Van Antwerp et al. |
| 2004/0018300 A1 | 1/2004 | Baillet et al. .................. 427/162 |
| 2006/0006558 A1 | 1/2006 | Yamada |
| 2007/0105973 A1* | 5/2007 | Nicolson et al. ............. 523/106 |
| 2007/0296094 A1 | 12/2007 | Jiang et al. |
| 2009/0010986 A1 | 1/2009 | Ashton et al. ................. 424/422 |
| 2009/0234089 A1* | 9/2009 | Ueyama et al. ............... 526/279 |

FOREIGN PATENT DOCUMENTS

| DE | 10 2008 023798 A1 | 11/2009 |
| EP | 0117768 B1 | 12/1986 |
| EP | 0350890 A2 | 1/1990 |
| EP | 2270551 A2 | 1/2011 |
| FR | 2674529 A1 | 10/1992 |
| WO | 01/24839 A1 | 4/2001 |
| WO | 02/00749 A2 | 1/2002 |
| WO | 02/081183 A | 10/2002 |
| WO | 2004/020495 | 3/2004 |
| WO | 2006/010612 A1 | 2/2006 |
| WO | 2006/064085 A2 | 6/2006 |

* cited by examiner

Primary Examiner — James J Seidleck
Assistant Examiner — Peter A. Salamon
(74) *Attorney, Agent, or Firm* — Janet Sleath; Speckman Law Group PLLC

(57) ABSTRACT

The present invention relates to a polyurethane prepared from a mixture comprising: (a) at least one polyethylene glycol; (b) at least one di-isocyanate; (c) at least one polydialkyl siloxane diol; and (d) at least one diol of formula (I) wherein n is an integer from 1 to 25; wherein the polyethylene glycol, di-isocyanate, polydialkyl siloxane diol and diol are reacted under substantially anhydrous conditions. Further aspects of the invention relate to a process for preparing a polyurethane. The invention also relates to a process for preparing a polyurethane xerogel in the form of a molded article, said process comprising the steps of: (i) preparing a reaction mixture comprising at least one polyethylene glycol, at least one di-isocyanate, at least one polydialkyl siloxane diol and at least one diol of formula I as described above; (ii) reacting the reaction mixture formed in step (i) under substantially anhydrous conditions to form a polyurethane xerogel; and (iii) injection molding the polyurethane xerogel to form a molded article.

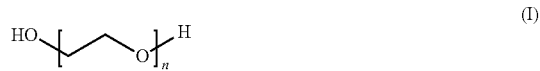

(I)

29 Claims, No Drawings

POLYMERS FOR CONTACT LENSES

CROSS REFERENCE TO RELATED APPLICATIONS

This application is a U.S. national phase application under 35 U.S.C. §371 of International Application No. PCT/GB2010/002020, filed on Nov. 2, 2010, which claims priority to and the benefit of United Kingdom Patent Application No. 0919459.8 filed on Nov. 6, 2009. The entire disclosures of each of the above-identified patent applications are incorporated by reference herein.

The present invention relates to thermoplastic polyurethane-based polymers that have applications in the field of contact lens technology. The invention also relates to a process for preparing such materials.

BACKGROUND TO THE INVENTION

Soft contact lenses offer a viable alternative to spectacles for the correction of visual defects such as myopia, hypermetropia and astigmatism. Early lenses were manufactured from polymers based on 2-hydroxyethyl methacrylate, (HEMA). Although these lenses provided some comfort but did not provide sufficient oxygen permeability to prevent problems associated with corneal hypoxia. Attempts to address this problem included copolymerising HEMA with hydrophilic monomers such as methacrylic acid and N-vinyl pyrrolidone. Although these polymers increased the level of oxygen permeability, the incorporation of these comonomers also leads to problems such as protein and lipid deposition, corneal desiccation, staining and lens dehydration.

More recently, a new generation of polymers has been developed to further increase the level of oxygen. These materials are based on the copolymerisation of silicone methacylates with hydrophilic comonomers. The lenses produced from these materials were originally designed for extended wear. Though daily wear products also exist now. Although successful in further increasing DK, these new materials still suffer from limitations such as lipid binding and dryness, all of which decrease lens on eye comfort.

There is therefore still a need for new contact lens polymers, which offer sufficient oxygen levels for normal corneal metabolism during daily wear, and which provide a high level of comfort throughout the day.

One class of polymers which holds considerable promise for novel contact lens materials are PEG based polyurethanes.

Urethane chemistries have also been widely investigated in the field of biomedical devices. For example, U.S. Pat. No. 3,786,034 discloses hard, hydrophilic polyurethane materials formed from reacting a specific polyol with a polyfunctional isocyanate. U.S. Pat. No. 3,821,186 teaches similar such materials. Likewise, U.S. Pat. No. 4,136,250 teaches a polymer formed by reacting a high molecular weight polydimethyl siloxane diol with 2 mole equivalents of isophorone di-isocyanate and then reacting with excess hydroxyl-containing monomers. Further urethane copolymers are disclosed in U.S. Pat. No. 4,454,309 and U.S. Pat. No. 4,359,553.

U.S. Pat. No. 6,930,196 discloses polyurethane hydrogel contact lenses prepared from prepolymers made by reacting (a) at least one multifunctional compound; (b) at least one di-isocyanate; and (c) at least one diol. The prepolymers so formed are then reacted with excess water to form a hydrogel polymer suitable for use as a contact lens.

U.S. Pat. No. 4,644,033 discloses a polyurethane hydrogel formed from the reaction of a polyoxyethylene and a polyfunctional isocyanate in a non-aqueous solvent. The materials can be molded into contact lenses.

U.S. Pat. No. 5,932,200 discloses a polyurethane formed from reacting a diol component and an organic di-isocyanate with critical selection of the amount of water in the reaction mixture and the diol component. The polyurethane is in the form of a gel that has applications in burn/wound care dressings and as surgical implants.

U.S. Pat. No. 4,885,966 and U.S. Pat. No. 5,175,229 disclose hydrophilic polymeric soft contact lenses prepared from prepolymers that are isocyanate-capped oxyethylene-based diols or polyols having a molecular weight of about 7000 to 30,000, wherein essentially all of the OH groups are capped with polyisocyanate. The prepolymers are hydrated to form polyurea-polyurethane polymers that are characterised by having a non-ionic surface which is resistant to non-specific protein adsorption.

U.S. Pat. No. 4,989,710 discloses linear polymers comprising polyurethane/urea polyethylene glycol combined with units of polypropylene glycol. The presence of polypropylene glycol leads to a higher modulus and tensile strength.

U.S. Pat. No. 5,563,233 discloses a hydrophilic polyether polyurethane polymer which is the reaction product of a polyoxyalkylene glycol, a glycol and an organic di-isocyanate. Similarly, U.S. Pat. No. 5,932,200 and U.S. Pat. No. 5,120,816 discloses contact lenses made from hydrogels derived from the reaction product of polyethylene glycols and di-isocyanates. Urea groups are introduced into the backbone by incorporating qualitatively measured amounts of water into the reaction mixture. In each case, the presence of water leads to the formation of urea groups in the backbone chain which in turn gives rise to increased modulus values that are undesirable in the contact lens industry.

The use of silicone-containing polymers has led to contact lenses exhibiting much higher oxygen permeabilities. However, the incorporation of silicone can lead to other adverse performance characteristics, such as surface wettability problems.

Silicone-containing materials suitable for contact lens technology are described in U.S. Pat. No. 6,312,706, which discloses a hydrogel material that is the polymerisation product of a comonomer mixture comprising (a) a polysiloxane-containing urethane prepolymer end-capped with polymerizable ethylenically unsaturated organic radicals, (b) tris-(trimethylsiloxy)silyl propyl methacrylate and (c) a hydrophilic comonomer.

U.S. Pat. No. 4,136,250 teaches polymers formed from mono-olefinic monomers cross-linked with a major amount of a di- or tri-olefinic polysiloxane based macromer having a molecular weight between about 400 and about 800.

U.S. Pat. No. 4,962,178 discloses siloxane-urethane polymers suitable for use as oxygen permeable membranes or ophthalmic devices, having based on total urethane groups 50-80% of —C—NH—COO—C— groups and 50-20% of —C—NH—COO—Si— groups, which consists essentially of the polymerisation product of (a) 80-95% weight of a poly-isocyanate capped, linear or branched polysiloxane prepolymer and (b) 20-50% by weight of a linear polydialkyl or polydiphenyl-siloxane disilanol having terminal siloxanol groups.

U.S. Pat. No. 4,983,702 discloses a cross-linked siloxane-urethane polymer in the form of an ophthalmic device, which consists essentially of the reaction product of (a) a di- or poly-hydroxyalkyl substituted alkyl polysiloxane and (b) an aliphatic, cycloaliphatic or atomatic di- or tri-isocyanate, wherein the total number of hydroxyol groups in component (a) is stoichiometrically equivalent to the total number of isocyanate groups in component (b), and with the proviso that an effective cross-linking amount of (a) or (b) is present and possesses a functionality of greater than two.

U.S. Pat. No. 4,711,943 discloses a non-fibrous polymeric contact lens material having improved oxygen permeability and stability, said material comprising a monomer having a first portion for increasing wettability which is hydrophilic and includes a side chain functionality selected from —CO—N— or —O—CO—N— (such as an acrylamide), and a second portion for increasing oxygen permeability, said second portion including a siloxane.

The present invention seeks to provide new silicone-containing polyurethane-based materials that are suitable for use in the contact lens industry. The silicone-containing polyurethane-based materials of the invention are thermoplastic copolymers that exhibit exemplary physical properties, for example, in terms of modulus, oxygen permeability, light transmissibility, surface wettability and wearer comfort over extended periods. Advantageously, the thermoplastic materials described herein are suitable for use in conventional injection molding apparatus, thereby enabling high throughput production of contact lenses.

STATEMENT OF INVENTION

A first aspect of the invention relates to a polyurethane xerogel prepared from a mixture comprising:
(a) at least one polyethylene glycol;
(b) at least one di-isocyanate;
(c) at least one polydialkyl siloxane diol
(d) at least one diol of formula I,

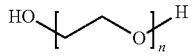

I wherein n is an integer from 1 to 25, preferably 1 to 10, more preferably 1 to 4;
wherein the polyethylene glycol, di-isocyanate, polydialkyl siloxane diol and diol are reacted under substantially anhydrous conditions.

According to one embodiment, the polydialkyl siloxane diol comprises one or two terminal carbinol groups, typically, two terminal carbinol groups. Advantageously, the present invention involves reacting the reactants under substantially anhydrous conditions to form a polyurethane xerogel, i.e. without the addition of water as a reactant, in contrast to methods known in the art in which water is deliberately incorporated as a reactant. The incorporation of urea groups (formed from water present in the reaction mixture) increases the modulus value of the material, which is undesirable in materials for use in the contact lens industry. Advantageously, the present invention substantially excludes water from the reaction mixture, thereby minimising the formation of urea groups in the polymer backbone and giving rise to materials having lower, more desirable modulus values. The presently claimed materials are thermoplastic polymers that are suitable for injection and compression molding. The materials are also suitable for cast molding, in the same way as traditional non-thermoplastic materials are cast molded to make contact lenses.

A second aspect of the invention relates to a polyurethane hydrogel which comprises the polyurethane xerogel as described above in hydrated form.

A third aspect of the invention relates to a process for preparing a polyurethane xerogel, said process comprising:
(i) preparing a mixture comprising at least one polyethylene glycol, at least one di-isocyanate, at least one polydialkyl siloxane diol and at least one diol of formula I

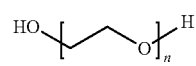

I wherein n is an integer from 1 to 25, preferably 1 to 10, more preferably 1 to 4;
(ii) reacting the mixture formed in step (i) under substantially anhydrous conditions to form a polyurethane xerogel.

A fourth aspect of the invention relates to a polyurethane xerogel obtainable by the above process.

A fifth aspect of the invention relates to a process for preparing a polyurethane hydrogel, said process comprising preparing a polyurethane xerogel as described above, and hydrating said polyurethane xerogel with an aqueous medium to form a polyurethane hydrogel.

A sixth aspect of the invention relates to a polyurethane hydrogel obtainable by the process described above.

A seventh aspect of the invention relates to a process for preparing a polyurethane xerogel in the form of a molded article, said process comprising the steps of:
(i) preparing a reaction mixture comprising at least one polyethylene glycol, at least one di-isocyanate, at least one polydialkyl siloxane diol and at least one diol of formula I

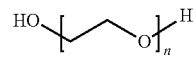

I wherein n is an integer from 1 to 25, preferably 1 to 10, more preferably 1 to 4;
(ii) reacting the reaction mixture formed in step (i) under substantially anhydrous conditions to form a polyurethane xerogel; and
(iii) injection molding the polyurethane xerogel to form a molded article.

An eighth aspect of the invention relates to a process for preparing a polyurethane hydrogel in the form of a molded article, said process comprising preparing a polyurethane xerogel in the form of a molded article as described above, and hydrating said molded article with an aqueous medium to form a polyurethane hydrogel.

A ninth aspect of the invention relates to an article of manufacture comprising a polyurethane xerogel or a polyurethane hydrogel as described above.

A tenth aspect of the invention relates to the use of a polyurethane xerogel or a polyurethane hydrogel as described above in the preparation of a contact lens.

DETAILED DESCRIPTION

Definitions

The functionality of a compound is used to refer to the number of functional groups that are capable of reacting in the reaction mixture. As such a "diol" refers to a compound comprising two hydroxyl functional groups capable of reacting in the reaction mixture and a "diisocyanate" refers to a compound comprising two NCO functional groups capable of reacting in the reaction mixture.

"DK" is a measure of the oxygen permeability of a material provided in Barrer units where 1 Barrer=$10^{-11}$ cm$^2$·mL·mmHg.

The term "hydrogel" is used herein to refer to a polymer comprising 10 wt % or more water. Generally, a hydrogel in an aqueous medium will absorb water and retain its original dry shape but it will be enlarged. It will not dissolve in water to form a fluid unless it is significantly degraded.

The term "xerogel" is used to refer to a polymeric material which may form a hydrogel upon contact with sufficient water. Generally a xerogel is dry and comprises less than 5 wt. % water.

The terms "substantially anhydrous" and/or "dehydrated" are used herein to refer to conditions in which the amount of water is sufficiently low so as to produce a polyurethane backbone that is substantially free from urea groups. Preferably the amount of water in the reactant mixture is less than about 0.3 wt. %, more preferably less than about 0.1 wt. %, even more preferably less than about 0.05 wt. %.

The term "carbinol" is used to refer to a hydroxyl functional group attached to a carbon atom. The carbon atom may be attached to a carbon atom (in particular a carbon atom forming part of a hydrocarbon group), a non-carbon atom including Si, N and O.

The term "small alkyl group" refers to an alkyl group having a carbon backbone of 1 to 6 carbon atoms, typically 1 to 4 carbon atoms.

Polymeric Material

The present invention relates to a silicone-containing polyurethane xerogel or hydrogel that is suitable for use as a contact lens. The polymeric material is prepared by reacting a polyethylene glycol, a diol of formula I, a polydialkyl siloxane diol and at least one di-isocyanate under the conditions described above.

Preferably, the polymeric materials of the invention are thermoplastic, i.e. the polymer softens and can flow when exposed to heat and pressure. The thermoplastic polymers described herein are ideal for use in the contact lens industry as they enable the cost effective manufacture of lenses on a large scale compared to processes which rely on reaction cast molding.

Moreover, the absence of water (as far as practically attainable) minimises the formation of urea groups in the polymer backbone, thereby giving rise to materials having lower, more desirable modulus values for the contact lens industry.

Advantageously, the compositions do not contain any secondary OH groups. The resulting polymers therefore exhibit high thermal stability and resistance to oxidative degradation. Preferably, the compositions are water insoluble.

Preferably, the polyurethane xerogel of the invention is in the form of a contact lens.

Polyethylene Glycol

The present invention involves the use of at least one polyethylene glycol (PEG).

Preferably, the polyethylene glycol has a molecular weight of from about 500 to about 100,000, more preferably from about 1000 to about 50,000, even more preferably from about 3000 to about 10,000, more preferably still from about 5000 to about 8000.

In one highly preferred embodiment, the polyethylene glycol is PEG 6000. In another highly preferred embodiment, the PEG is selected from PEG 6088, PEG 3350 and PEG 1000.

Polyethylene glycols of varying molecular weights are commercially available and can be used to afford the polymeric materials of the present invention. Blends of two or more different molecular weight polyethylene glycols can also be used.

Preferably, the polyethylene glycol is used in an amount of from about 20 to about 80 wt % of the reactants, more preferably from about 30 to about 70 wt %, more preferably from about 35 to about 60 wt %, more preferably still, from about 40 to about 60 wt % of the reactants.

Diol

The polymer composition of the invention is prepared using at least one chain extender, which is a diol of formula I,

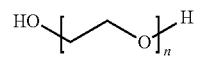

I wherein n is an integer from 1 to 25, preferably 2 to 25, suitably 2 to 10, more suitably 2 to 4. Where n is 2 or more, the diol includes one or more ether groups. The presence of such ether groups increases the hydrophilicity of the resultant composition.

In one embodiment, the diol is ethylene glycol (EG), i.e. n is 1.

In one highly preferred embodiment, the diol is diethylene glycol (DEG), i.e. n is 2.

In one highly preferred embodiment, the diol is triethylene glycol (TEG), i.e. n is 3. Advantageously, compositions derived from TEG produce thermoformable polymers that show high light transmissibility in the fully water swollen state.

In one highly preferred embodiment, the diol is tetraethylene glycol (TTEG), i.e. n is 4.

Preferably, the diol is used an amount of from 5 to about 45 wt % of the reactants, more preferably from about 10 to about 25 wt % of the reactants.

Where the diol is EG, preferably A is used in an amount of from about 2 to about 10 wt % of the reactants, more preferably from about 2 to about 6 wt % of the reactants.

Where the diol is DEG, preferably it is used in an amount of from about 5 to about 20 wt % of the reactants, more preferably, from about 10 to about 16 wt % of the reactants.

Where the diol is TEG, preferably it is used in an amount of from about 8 to about 45 wt % of the reactants, more preferably from about 14 to about 30 wt % of the reactants, even more preferably, from about 15 to about 25 wt % of the reactants.

Where the diol is TTEG, preferably it is used in an amount of from about 20 to about 30 wt % of the reactants.

The proportion of the diol within a given composition can also affect the material properties. The diol reacts with NCO groups (e.g. Desmodur W) to form the "hard" blocks within the resultant polymer matrix that affords the strength (tensile properties) to the material. The skilled person would thus appreciate that the proportion of the given diol can be adjusted in order to fine tune the tensile and other properties of the resulting material.

Preferably, the diol of formula I is used in an amount of about 2 to about 60 mole equivalents to the amount of PEG, preferably, from about 5 to about 30 mole equivalents, even more preferably, from about 15 to about 22 mole equivalents relative to the PEG in a given composition.

Di-isocyanate

The polymer composition of the invention is prepared using at least one di-isocyanate. Preferably, the di-isocyanate is an organic di-isocyanate. The di-isocyanate performs a number of different functions. Firstly, it acts as a coupling agent for the polyethylene glycol component to produce the soft segment. Secondly, it acts as a coupling agent for the diol component to produce urethane-rich hard segments. Thirdly, it acts as a coupling agent for the soft and hard segments to build up the molecular weight of the resulting polymer.

The diisocyanate is preferably an aliphatic diisocyanate. Aliphatic diisocynates which are fluid at ambient temperatures are particularly preferred, Preferably, the di-isocyanate is of the formula OCN—$R_1$—NCO, wherein $R_1$ is a linear or branched $C_3$-$C_{18}$-alkylene, an unsubstituted or $C_1$-$C_4$-alkyl-substituted or $C_1$-$C_4$-alkoxy-substituted $C_6$-$C_{10}$-arylene, a $C_7$-$C_{18}$-aralkylene, a $C_6$-$C_{10}$-arylene-$C_1$-$C_2$-alkylene-$C_6$-$C_{10}$-arylene, a $C_3$-$C_8$-cycloalkylene, a $C_3$-$C_8$-cycloalkylene-$C_1$-$C_6$-alkylene, a $C_3$-$C_8$-cycloalkylene-$C_1$-$C_6$-alkylene-$C_3$-$C_8$-cycloalkylene or a $C_1$-$C_6$-alkylene-$C_3$-$C_8$-cyclo-alkylene-$C_1$-$C_6$-alkylene.

Examples of particularly preferred diisocyanates include methylene dicyclohexyl diisocyanate, hexamethylene diisocyanate, isophorone diisocyanate, toluene-2,4-diisocyanate, toluene-2,6-diisocyanate, mixtures of toluene-2,4 and 2,6-diisocyanates, ethylene diisocyanate, ethylidene diisocyanate, propylene-1,2-diisocyanate, cyclohexylene-1,2-diisocyanate, cyclohexylene-1,4-diisocyanate, m-phenylene diisocyanate, 4,4"-biphenylene diisocyanate, 3,3"-dichloro-4,4"-biphenylene diisocyanate, 1,6-hexamethylene diisocyanate, 1,4-tetramethylene diisocyanate, 1,10-decamethylene diisocyanate, cumene-2,4-diisocyanate, 1,5-napthalene diisocyanate, 1,4-cyclohexylene diisocyanate, 2,5-fluorene-diisocyanate, polymeric 4,4'-diphenylmethane diisocyanate.

In one highly preferred embodiment, the di-isocyanate is Desmodur W (methylene bis(4-cyclohexyl isocyanate), MW=262.5).

Preferably, the di-isocyanate is used in an amount of from about 0.05 to about 55, more preferably from about 10 to about 40, more preferably, from about 20 to about 40 wt % of the reactants. The amount of di-isocyanate in any given composition can be adjusted to modify the relevant contact lens properties/attributes.

The stoichiometry (OH/NCO ratio) of the reacting mixture plays an important part in determining the properties of the resultant polymer, for example, the molecular weight/modulus of the material, is expected to be relatively higher for a 1:1 NCO:OH stoichiometry, and such a material is also expected to afford relatively lower water content on hydration than the polymer afforded by a composition that has a non stoichiometric ratio (e.g. OH groups >NCO groups). The skilled person would thus appreciate that the NCO:OH stoichiometry can be adjusted so as to obtain a material with the desired modulus and to some degree water content.

In one particularly preferred embodiment, the polyethylene glycol, the chain extender and the di-isocyanates are employed in such proportions as to provide an overall NCO/OH ratio of less than 1.2, preferably from 0.8 to about 1.1, more preferably from about 0.85 to about 0.99, more preferably from about 0.95 to about 0.98.

Preferably, the reaction takes place in the presence of a catalyst. Catalysts may be used to speed up the polymerization reaction and any of those catalysts normally used by those skilled in the art may be employed. For example, suitable catalysts include dibutyltin dilaurate, $FeCl_3$, stannous octoate, tertiary amines such as triethylamine and the like. In one highly preferred embodiment, the catalyst is dibutyl tin dilaurate (DBTDL).

Preferably, the catalyst is used in an amount of from about 0.01 wt % to about 2.0 wt %, or from about 0.01 wt % to about 1.0 wt % of the reactants, more preferably, from about 0.03 to about 0.8 wt %, even more preferably from about 0.05 wt % to about 0.5 wt %, more preferably still, from about 0.05 wt % to about 0.2 wt %, more preferably about 0.05 to about 0.1 wt % of the reactants. In one highly preferred embodiment, the catalyst is used in an amount of about 0.05 wt % of the reactants.

Preferably, the reaction mixture is in the form of a dry mixture, i.e. the mixture is substantially anhydrous and substantially excludes water. Preferably, the components of the reaction mixture are liquid at ambient temperature.

The reaction of the invention proceeds with the di-isocyanate reacting randomly with the PEG, the diol and the polydialkyl siloxane diol to eventually form a thermoplastic polymer matrix/material. Advantageously, the resulting polymer matrix allows high flux of oxygen, resulting in a high DK lens.

Polydialkyl Siloxane Diol

The polymeric material of the present invention is prepared from at least one polydialkyl siloxane diol.

The reaction of the invention involves reacting the OH groups of the polydialkyl siloxane diol, diol and PEG components with isocyanate groups to form a polyurethane. Polydialkyl siloxanes are substantially hydrophobic, whereas the diol component is substantially hydrophilic. In order to overcome any potential compatibility problems, the polydialkyl siloxane hydride terminated is first reacted with an allylpolyglycol in a hydrosilylation reaction to form a polydialkyl siloxane diol (also referred to hereinafter as the "silicone macromer") as follows:

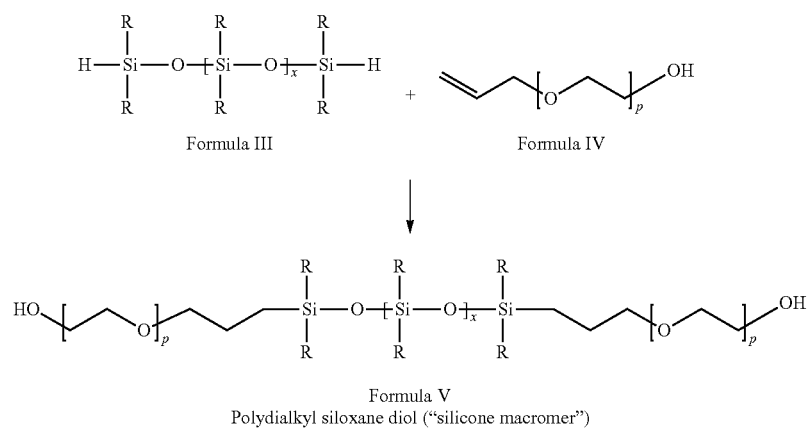

Formula V
Polydialkyl siloxane diol ("silicone macromer")

where R is alkyl, p is an integer from 1 to 110 and x is an integer from 1 to 324.

Other allyl glycols may also be used in the above reaction instead of the compound of formula IV. For example, alternative reactants include the following:

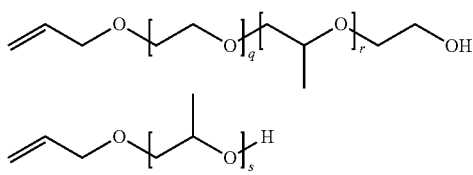

where q is an integer from 1 to 40, r is an integer from 1 to 10 and s is an integer from 1 to 25.

Preferably, the hydrosilylation is carried out in the presence of a catalyst. More preferably, the catalyst is a palladium catalyst. Even more preferably still, the palladium catalyst is platinum(0)-1,3-divinyl-1,1,3,3-tetramethyldisiloxane complex solution in xylene, Pt ~2%.

The hydrosilylation reaction changes the hydrophobic nature of the polydialkyl siloxane to a relatively hydrophilic reactive monomer with OH functional groups. This improves the compatibility with the other co-reactants in the reaction mixture.

In one particularly preferred embodiment, the polydialkyl siloxane diol is prepared by reacting polydimethyl siloxane hydride terminated (PDMS) with an allyl polyglycol such as polyethylene glycol monoallyl.

According to one embodiment, the polydialkyl siloxane diol comprises one or two terminal carbinol groups.

In particular, the polydialkyl siloxane diol may comprise a hydrocarbyl group between the siloxane group and the or each carbinol group. The hydrocarbyl group may be substituted or unsubstituted, typically with one or more small alkyl groups. Alternatively or additionally, the hydrocarbyl group may comprise one or more ether, or ester groups. Typically the hydrocarbyl group is unsubstituted. Alternatively, the hydrocarbyl group comprises an ether group. According to a further embodiment, the hydrocarbyl group comprises an ester group.

The hydrocarbyl group typically has a carbon backbone of 5 to 150 carbon atoms. According to one embodiment, the hydrocarbyl group is unsubstituted and has a carbon backbone of 1 to 10 carbon atoms, generally 1 to 5 carbon atoms, typically 3 to 5 carbon atoms.

Alternatively, the hydrocarbyl group comprises an ether group and has a carbon backbone of 5 to 50 carbon atoms, typically 5 to 40 carbon atoms.

According to a further embodiment, the hydrocarbyl group comprises an ester group and has a carbon backbone of 90 to 150 carbon atoms, typically 100 to 150 carbon atoms.

Generally the polydialkyl siloxane diol has a molecular weight of 500 to 10000, typically 1000 to 7000.

Typically the alkyl groups of the polydialkyl siloxane diol are small alkyl groups. According to one embodiment, the polydialkyl siloxane diol is a polydimethyl siloxane diol.

The term "Silicone Macromer" or "Carbinol terminated polydialkyl siloxane" is generally used to refer to a dihydroxy terminated block copolymer oxyethylene-dimethylsiloxane-oxyethylene (eg., formula V described in this document) or oxypropylene-dimethylsiloxane-oxypropylene oxide or caprolactone-dimethylsiloxane-caprolactone of different molecular weights containing different weight % of non-siloxane units. Some such compounds are also available commercially e.g., Gelest Inc. supplies compounds like DMS-C15 having a molecular weight of around 1000, and a non-siloxane content of around 20 wt %, DBE-C25 having a molecular weight of around 3500-4500, and a non-siloxane content of around 60 wt %}, DBP-C22 having a molecular weight of around 2500-3200, and a non-siloxane content of around 45-55 wt %, DBL-31 having a molecular weight of around 5700-6900, and a non-siloxane content of around 50 wt %.

The polydialkyl siloxane diol typically has the structure of Formula V

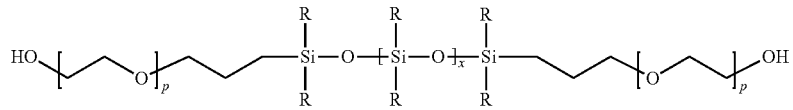

Alternatively the polydialkyl siloxane diol has the structure of Formula VI:

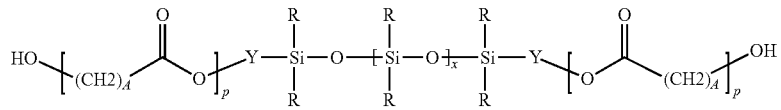

where R represents a small alkyl group, typically methyl, Y represents an alkyl group (generally having a carbon backbone of 1 to 25 carbon atoms, typically 1 to 6 carbon atoms), p is an integer from 1 to 110, x is an integer from 1 to 324 and A in an integer from 1 to 25, typically 1 to 10, generally 3 to 7, suitably 5.

According to one embodiment the polydialkyl siloxane diol has the structure of Formula V and has an associated molecular weight of 600 to 10000.

According to further embodiment, the polydialkyl siloxane diol has the structure of Formula VI and has a molecular weight of 5500 to 7000.

According to one embodiment, the polydialkyl siloxane did is an oxyethylene-dimethylsiloxane-oxyethylene block polymer. Alternatively the polydialkyl siloxane diol is a oxypropylene-dimethylsiloxane-oxypropylene block copolymer. According to a further embodiment the polydialkyl siloxane diol is a caprolactone-dimethylsiloxane-caprolactone block copolymer.

The polydialkyl siloxane diol may comprise a mixture of more than one of the compounds described above. In particular, the polydialkyl siloxane diol may include more than one compound of Formula V and/or Formula VI having different molecular weights.

In one preferred embodiment, the polydialkyl siloxane diol is hydroxyethoxy-propyl terminated PDMS.

In one highly preferred embodiment, the polydialkyl siloxane diol is a polydimethyl siloxane diol, i.e. R is methyl in formula III.

Preferably, the starting polydialkyl siloxane dihydride terminated has a molecular weight of from about 200 to about 12,000, even more preferably, from about 500 to about 2000.

Preferably, the allylpolyglycol has a molecular weight of from about 200 to about 2000, even more preferably, from about 500 to about 1200.

In one particularly preferred embodiment, the silicone macromer is 2780 which is manufactured from allyl polyglycol 1100 and PDMS hydride terminated (MW=580).

In another particularly preferred embodiment, the silicone macromer is 1580 which is manufactured from allyl polyglycol 500 and PDMS hydride terminated (MW=580).

Similarly Carbinol (hydroxyl) terminated polydimethyl siloxanes such as copolymers of general architecture (oxyethylene)-(dimethylsiloxane)-(oxyethylene), (oxypropylene)-(dimethylsiloxane)-(oxypropylene) and (carpolactone)-(dimethylsiloxane)-(carpolactone) of different molecular weights and containing different non-siloxane content can be used. Any of these for simplicity may be referred to herein as the silicone macromer.

The second step of the reaction involves reacting the OH groups of the polydialkyl siloxane diol, PEG and diol components with isocyanate groups to form a polyurethane. The reaction of the invention proceeds with the di-isocyanate reacting randomly with the PEG, diol and silicone macromer to form a polymer matrix. Advantageously, the resulting polymer matrix allows high flux of oxygen, resulting in a high DK lens.

Catalysts may be used to speed up the polyurethane formulation and any of those catalysts normally used by those skilled in the art may be employed. For example, suitable catalysts include dibutyltin dilaurate, stannous octoate, tertiary amines such as triethylamine and the like. In one highly preferred embodiment, the catalyst is dibutyl tin dilaurate (DBTDL).

Preferably, the catalyst is used in an amount of from about 0.02 wt % to about 1.0 wt % of the reactants, more preferably, from about 0.05 wt % to about 0.5 wt %, even more preferably, from about 0.05 wt % to about 0.2 wt %, of the reactants.
Additional Components In one preferred embodiment, the composition further comprises one or more antioxidants. Suitable antioxidants include BHA (butylated hydroxyl anisole), BHT (butylated hydroxytoluene) and ascorbic acid. Preferably, the antioxidant is BHA.

Preferably, the antioxidant is used in an amount of about 0.01 to about 10 wt % of the reactants, more preferably from about 0.1 to about 5 wt %, even more preferably from about 0.2 to about 1 wt % of the reactants in any given composition.

According to one embodiment of the present invention, the antioxidant is present at an amount of about 1.0 to about 3.0 wt % of the reactants.

In one preferred embodiment of the invention, the composition further comprises one or more additional components such as a modulus modifier, plasticizer, humectant, lubricant, process aid, viscosity reducer, compatibility enhancer and/or polymer matrix structure modifier. Preferably, the additional component is present in an amount of 0 to about 20 wt %, more preferably from about 2.5 to about 10 wt %, more preferably still, about 4 to about 6 wt % of the reactants.

Suitable modulus modifiers include components that alter the modulus property of the polyurethane and may also alter the oxygen permeability property. In one particularly preferred embodiment, the additional component is poly(ethylene glycol) dimethyl ether (PEG DME), which can act as a modulus modifier, plasticizer, humectant/lubricant, process aid, viscosity reducer, compatibility enhancer and polymer matrix structure modifier. PEG DMEs of various molecular weights (e.g. 250, 500, 1000, 2000) are commercially available and are suitable for use in the present invention. Preferably, for the purposes of the present invention, the PEG DME has a molecular weight of 1000 (e.g. PEG DME-1000). As an alternative, polyethylene glycol dibutyl ether can also be used.

Advantageously, the incorporation of PEG DME into the polymer compositions of the invention leads to lenses having a reduced modulus. Preferably, the modulus of lenses prepared from the polymer compositions of the invention is from about 0.1 to about 1.2 MPa, more preferably, about 0.3 to about 0.8 MPa even more preferably from about 0.4 to about 0.5 MPa.

In one preferred embodiment, the composition of the invention further comprises one or more tinting agents. By way of example, suitable tinting agents commonly used in the contact lens industry include the following: benzene sulfonic acid, 4-(4,5-dihydro-4-((2-methoxy-5-methyl-4-((2-(sulfooxy)ethyl)sulfonyl)phenyl)azo-3-methyl-5-oxo-1H-pyrazol-1-yl); [2-naphthalene-sulfonic acid, 7-(acetylamino)-4-hydroxyl-3-((4-((sulfo-oxyethyl)sulfonyl)phenyl)azo)-]; [5-((4,6-dichloro-1,3,5-triazin-2-yl)amino-4-hydroxy-3-((1-sulfo-2-naphthalenyl)azo-2,7-naphthalene-disulfonic acid, trisodium salt]; [copper, 29H, 31H-phthalocyaninato(2-)-$N_{29}, N_{30}, N_{31}, N_{32}$)—, sulfo((4((2-sulfooxy)ethyl)sulfonyl)-phenyl)amino)sulfonyl derivative]; and [2,7-naphthalene-sulfonic acid, 4-amino-5-hydroxy-3,6-bis((4-((2-(sulfooxy)ethyl)sulfonyl)phenyl)azo)-tetrasodium salt].

Particularly preferred tinting agents for use in the present invention are phthalocyanine pigments such as phthalocyanine blue and phthalocyanine green, chromic-alumina-cobaltous oxide, chromium oxides, and various iron oxides for red, yellow, brown and black colours, chromophtal violet and chromophtal oxide green. The use of organic pigments, particularly phthalocyanine pigments, more particularly copper phthalocyanine pigments, and even more particularly copper phthalocyanine blue pigment (e.g., Colour Index Pigment Blue 15, Constitution No. 74160) is preferred. Opaquing agents such as titanium dioxide may also be incorporated. For certain applications, a mixture of colours may be employed for better simulation of natural iris appearance.

In one preferred embodiment, the tinting agent is a handling tint such as Reactive Blue 4.

Preferably, the weight percentage of the tinting agent is from about 0.0001% to about 0.08%, more preferably, 0.0001% to about 0.05%. In one preferred embodiment, the tinting agent is present in an amount of from about 0.005 to 0.08 wt %. In one preferred embodiment, the weight percentage of the tint is from about 0.0001% to about 0.04%, more preferably, from about 0.0001% to about 0.03 wt % of the reactants.

In one preferred embodiment, the composition of the invention further comprises one or more UV blockers or UV absorbers. A UV absorber may be, for example, a strong UV absorber that exhibits relatively high absorption values in the UV-A range of about 320-380 nanometers, but is relatively transparent above about 380 nm. Preferably, the UV Blocker is a commercially available UV Blocker such as AEHB (acryloxyethoxy hydroxybenzophenone; $C_{18}H_{16}O_5$).

Generally speaking, a UV absorber, if present, is provided in an amount from about 0.5 wt % to about 1.5 wt % of the reactants. Particularly preferred are compositions which include from about 0.6 wt % to about 1.0 wt % UV absorber, more preferably, about 1.0 wt % of the reactants.

The tinting agent and/or UV blockers can be charged into the lenses at the lens hydration stage post polymerisation after formation of the lenses by injection/compression moulding. Alternatively additives (e.g. tinting agents, UV blockers, and others) can be mixed with the molten polymer and extruded prior to pelletisation.

Process

Another aspect of the invention relates to a process for preparing a polyurethane xerogel, said process comprising:
(i) preparing a mixture comprising at least one polyethylene glycol, at least one di-isocyanate, at least one polydialkyl siloxane diol and at least one diol of formula I

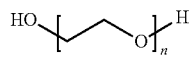
I wherein n is an integer from 1 to 25, preferably 2 to 10, more preferably 2 to 4;
(ii) reacting the mixture formed in step (i) under substantially anhydrous conditions to form a polyurethane xerogel.

Preferably, the polyurethane xerogel is then processed to form a molded article such as a contact lens. Suitable processing techniques include cast molding, injection molding, compression molding, spin cast molding and lathing. Additionally, sheets of the polymeric material can be made and devices can be punched out. The sheets of the material can be made by compressing the thermoplastic material between two plates (eg Teflon plates) and also from the solution of the material in an organic solvent. In the later case the solvent would require to be evaporated.

Advantageously, the process of the invention involves reacting the reactants under substantially anhydrous conditions to form a polyurethane xerogel, without the addition of water as a reactant. This results in a polyurethane backbone that is substantially free from urea groups, in contrast to methods known in the art. The absence of water (as far as practicable) prevents any significant formation of urea groups which can cause an increase of the swollen water modulus to a degree that is undesirable for contact lenses.

As used herein the term "substantially anhydrous" refers to conditions in which the amount of water is sufficiently low so as to produce a polyurethane backbone that is substantially free from urea groups.

Preferably, the reaction takes place with as little water as is practically attainable. More preferably, the reaction takes place with as little water as is practically attainable. More preferably, the amount of water in the reaction mixture is less than about 0.3%, more preferably less than about 0.1%, even more preferably less than about 0.05%.

A further aspect of the invention relates to a polyurethane xerogel obtainable by the above described process.

Another aspect of the invention relates to a process for preparing a polyurethane hydrogel, said process comprising preparing a polyurethane xerogel as described above, and hydrating said polyurethane xerogel with an aqueous medium to form a polyurethane hydrogel.

Yet another aspect of the invention relates to a polyurethane hydrogel obtainable by the process described above.

In one preferred embodiment, a catalyst is added to the reaction mixture. Suitable catalysts (together with guidance as to the appropriate amount) are as described above. In one highly preferred embodiment, the catalyst is dibutyl tin dilaurate (DBTDL).

Additional components, such as modulus modifiers, plasticizers, humectants, lubricants, process aids, viscosity reducers, tinting agents, compatibility enhancers and/or polymer matrix structure modifiers as described above, may also be present in the reaction mixture.

As mentioned above, the polymerisation reaction is carried out under substantially anhydrous conditions. Preferably, the reactants are dehydrated under vacuum to reduce the water content as far as possible. Preferably, the reactants (e.g. the diol component and the PEG component) are dehydrated under vacuum at elevated temperature using a rotary evaporator. More preferably, the reactants are dehydrated under vacuum at a temperature of at least 80° C., more preferably at least 95° C. Preferably, the reactants are dehydrated under vacuum at elevated temperature for at least 1 hour, more preferably, for at least 2 hours, even more preferably, for at least 4 hours or more. After this dehydration step, the moisture content of the reactants as measured by Karl Fisher is preferably <0.050%, more preferably, <0.035%. The conditions and timing of the dehydration process will depend upon the equipment used and the weight of material being dehydrated, generally more material will take longer to dehydrate. Optionally other methods e.g., freeze drying etc may also be employed to dehydrate.

In one preferred embodiment, the dehydrated diol (and optionally the antioxidant and/or plasticiser) is placed in a beaker in the oven and the dehydrated molten PEG is added thereto. Preferably, the required quantity of catalyst (e.g. dibutyl tin dilaurate) is then added to the mixture and the moisture content determined using Karl Fischer titration. Typically, the temperature is allowed to reach to about 73° C.$^+$-2° C. The beaker is then transferred into a fume hood the contents stirred thoroughly to give a homogenised mixture. The required quantity of the di-isocyanate (e.g. Desmodur W) is then added to the mixture and stirred until clear. The mixture is then typically dispensed into pre heated polypropylene tubs that are sealed with lids and reacted in an oven placed in a fume cupboard.

In one preferred embodiment, the reaction takes place at a temperature of from about 70° C. to about 120° C., more preferably, from about 80° C. to about 110° C. In one highly preferred embodiment, the reaction takes place at a temperature of from about 90° C. to about 100° C.

Preferably, the mixture is reacted for about 0.5 to about 24 hours, more preferably, for about 3 to about 12 hours. Even more preferably, the mixture is reacted for at least about 5 hours to about 12 hours, more preferably, for about 8 hours. The disappearance of the NCO absorption band at 2260 cm$^{-1}$ in the FTIR spectrum of the resulting product signifies that the reaction is complete.

The product is allowed to cool to ambient temperature and demolded, if required after chilling to a reduced temperature.

Preferably, the product is removed from the oven and allowed to cool to ambient temperature.

In one preferred embodiment, the product is cooled to a temperature of from about –30° C. to about –120° C. prior to removing the product from the mold.

Preferably, the product is chilled in a freezer. More preferably, still, the product is chilled to a temperature of from about –50° C. to about –90° C., even more preferably from about −60° C. to about −90° C. More preferably still, the product is chilled to a temperature of about −80° C. Preferably, the product is chilled for at least 20 minutes, more preferably, at least 60 minutes.

Advantageously, the cooling process allows the polymer chains to attain a temperature below the glass transition that shrinks the polymer matrix/material and reduces the interaction at the interface which enhances the demolding of the product. This also facilitates/eases the subsequent granulation of the material that produces granules suitable for feeding into an injection moulding machine.

Yet another aspect relates to the use of a polyurethane xerogel or polyurethane hydrogel according to the invention in the preparation of a contact lens.

Process for Preparing a Molded Article

Another aspect of the invention relates to a process for preparing a polyurethane xerogel in the form of a molded article, said process comprising the steps of:
(i) preparing a reaction mixture comprising at least one polyethylene glycol, at least one di-isocyanate, at least one polydialkyl siloxane diol and at least one diol of formula I

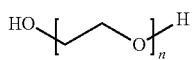
I wherein n is an integer from 1 to 25, preferably 2 to 10, more preferably 2 to 4;
(ii) reacting the reaction mixture formed in step (i) under substantially anhydrous conditions to form a polyurethane xerogel; and
(iii) injection molding the polyurethane xerogel to form a molded article.

In one preferred embodiment, the polyurethane xerogel formed in step (ii) is granulated by grinding or the formation of pellets (typically by extruding and chopping to forms pellets suitable for injection moulding), and optionally dried under vacuum, prior to injection molding. The injection molding preferably takes place using conventional injection molding apparatus (such as a BOY 50M), that will be familiar to one of ordinary skill in the art.

A further aspect of the invention relates to a process for preparing a polyurethane hydrogel in the form of a molded article said process comprising preparing a polyurethane xerogel in the form of a molded article as described above, and hydrating said molded article with an aqueous medium to form a polyurethane hydrogel.

Article of Manufacture

Another aspect of the invention relates to an article of manufacture comprising a polymer as described above.

Preferably, the article of manufacture is in the form of a contact lens.

A contact lens must be permeable to oxygen in order for the lens to facilitate normal corneal metabolism. Preferably, contact lenses prepared using the polymer composition of the invention exhibit a DK value of a least 10 Barrers more preferably, at least 20, even more preferably, at least 30 Barrers. More preferably still, the lenses have a DK of at least about 40 Barrers or more.

In one preferred embodiment, the lenses have a DK of about 15 to about 40 Barrers more preferably, from about 25 to about 40 Barrers.

A contact lens must be able to transmit light in the visible region in order to function effectively in correcting visual defects. Preferably, contact lenses prepared using the polymer composition of the invention exhibit a light transmissibility of at least 80%, more preferably at least 90%, even more preferably, at least 95% or 97%. Preferably, the light transmissibility is from about 90 to about 100%, more preferably from about 95 to about 100%, more preferably still, 100%.

Preferably, contact lenses prepared using the polymer composition of the invention exhibit a modulus of from about 0.1 to about 1.25 MPa, more preferably from about 0.25 to about 0.75 MPa.

The modulus of a contact lens plays a key role in controlling the mechanical properties of a soft contact lens, in addition, the on-eye performance is directly effected by the modulus. A value of greater than 1.25 MPa is likely to cause corneal staining whilst a modulus below 0.1 MPa is likely to lead to a lens with poor handling properties.

Preferably, contact lenses prepared using the polymer composition of the invention have a water content of 10 to about 90 weight %, more preferably, from about 20 to about 80 weight %, more preferably, from about 25 to about 75 weight %, even more preferably, from about 30 to about 70 weight %, more preferably still, from about 40 to about 70 weight %.

The equilibrium water content of the lens is a function of the material properties and plays a key role in determining the bulk, mechanical and physical properties of the lens. Water provides the medium to transmit oxygen and with the modulus governs the on eye properties/performance of the lens.

The present invention is further described with reference to the following non-limiting examples.

EXAMPLES

Example 1

Preparation of Silicone Macromer 1580

The components and actual weights are defined below:
Polydimethylsiloxane hydride terminated (Aldrich 423785)
Polyethylene glycol monoallyl (Polyglycol A500 & A1100 Clariant)
Platinum(0)-1,3-divinyl-1,1,3,3-tetramethyldisiloxane complex solution in xylene, Pt ~2% (Aldrich 479519) (platinum catalyst)

20.050 g of polydimethylsiloxane hydride terminated was added into a three-neck flask and placed in an oil bath. The platinum catalyst was then added. When the temperature of the contents was 50° C., the polyethylene glycol monoallyl A500 (34.527 g) was added drop wise through a syringe needle over a period of fifty minutes while the contents of the flask were stirred with a magnetic stirrer. The temperature of the reaction mixture rose to and was maintained at 65° C. After the addition of the monoallyl polyethylene glycol the reaction temperature was maintained at 65° C. and the reaction was allowed to continue for a further 2 hours. After this time the flask was lifted out of the oil bath and left to cool to ambient temperature.

Example 2

Preparation of Silicone Macromer 2780

40.012 g of polydimethylsiloxane hydride terminated was added into a three-neck flask and placed in an oil bath. The platinum catalyst was then added. When the temperature of the contents was 50° C., molten polyethylene glycol monoallyl A1100 (151.692 g) was added dropwise through a syringe needle over a period of ~1 hour while the contents of the flask were stirred with a magnetic stirrer. The reaction was continued for a further 4 hours and the temperature was maintained at 65+/−2° C. After this time the flask was lifted out of the oil bath. The product appeared milky and solidified at room temperature.

Example 3

Method of Manufacturing PFG-Si IM Polymers Based on Silicone Macromer 1580

Poly(ethylene glycol), PEG 6000 (Clariant) was dehydrated under vacuum at 95° C. for four hours and its number average molecular weight ($M_n$) was determined by end group analysis. The analysis afforded number average molecular weight, $M_n$=6088. Similarly, the number average molecular weights were determined for the other polyethylene glycols used and referred here in the examples displayed in the tables below.

Diethylene glycol (DEG), triethylene glycol (TEG), tetraethylene glycol (TTEG), and ethylene glycol (Aldrich) were checked for their moisture content by Karl Fisher and if the water content was <0.035% then these materials were considered to be substantially anhydrous and used without further dehydration, otherwise these were dehydrated under vacuum for a minimum of 2 hours at 95° C. using a rotary evaporator. PEG 3350($M_n$=3350) ex Cariant was dehydrated for 4 hours at 95° C. under vacuum or until the low level of moisture content is achieved, typically <0.050%.

Using a Mettler Toledo (AG 285) analytical balance BHA (0.1836 g) was weighed in a weighing boat and added into a quickfit 250 ml flask and then the silicone macromer 1580 (14.1421 g) was added to the same flask. The flask was stoppered and placed in an oven at 95° C. for 15 minutes to dissolve the BHA. Dehydrated TEG (16.186 g) was added to the flask and attached to a rotary evaporator with a bath temperature of 95° C. and the contents of the flask were degassed, carefully rotating, initially giving one or two turns, until the majority of the bubbles have disappeared, then rotating fully to degas over ~5 minutes. Once degassed, DBTDL (0.0576 g) was added through a syringe and a fine needle and mixed by swirling the contents of the flask. Dehydrated molten PEG 3350 (30.48 g) was added to the flask which was degassed again for ~5 minutes. Finally, Desmodur W (33.316 g) was added to the flask through a syringe that contained the appropriate quantity. The flask was stoppered and the contents were mixed by gently rotating the flask to reduce the formation of bubbles.

This mixture was then dispensed into lens molds by the usual method and closed. Separately the remaining material was dispensed into a pre heated polypropylene cup which was covered by a screw cap lid. Both the lens molds and the polypropylene cup were placed in an oven at 95° C. and reacted for 5 hours. The resulting product was in the form of cast molded lenses and from the polypropylene cup was demolded by chilling in a freezer at −80° C. over 30 minutes. The lenses were placed directly into glass vials containing saline.

These lenses after 24 hours of hydration appeared transparent, affording UV transmission at 550 nm>95%. The lenses were also used to determine the modulus.

The product from the polypropylene cup was granulated using SG Granulator (ex Shini Plastic Technologies Inc.). These granules were charged into a commercial molding machine (Boy 50M) and female parts using a standard lens mold tool were molded. These molded parts on hydration remained transparent.

The granules were also used to manufacture a few lens shaped objects by compression molding. These lens like objects were used to determine the DK of the material.

These results prove the thermoplasticity of the material. The water content of the molded part was also determined.

Example 4

The same method as described above was used to manufacture this composition except the amounts of the reactants varied according to the values given in the Table 1.

The lens product after hydration appeared transparent affording UV transmission at 550 nm>95%.

The product from the polypropylene cup was also subjected to the molding cycle and successfully molded the part. These results confirm the thermoplasticity of the material. The material was also used to manufacture lens like objects by the compression molding that were used to determine the properties of the material reported.

Water Content

Water content is calculated after measurement of dry weight and hydrated weight of a lens by using the following equation:

$$\text{Water Content (\%)} = (W_{hydrated\ lens} - W_{dry\ lens})/W_{hydrated\ lens} \times 100$$

Five hydrated lenses, with excess surface water removed, are separately weighed on an analytical balance and average value is taken as $W_{hydrated\ lens}$. The lenses are then dried in an oven at 75° C. for 2 hours and weighed again separately. The average value is taken as $W_{dry\ lens}$.

% Transmittance

% Transmittance was determined under the guidance of ISO 8599 by using a double beam UV spectrophotometer (Jasco V530). A lens is placed into a cuvette containing standard saline solution. The cuvette is placed in the sample compartment. A matching cuvette containing saline is placed in the reference compartment of the UV spectrophotometer and a spectrum as percent transmittance was recorded between 200-780 nm. The test was repeated a further four times and the mean value (% transmittance) at 550 nm was recorded.

The contact lenses thus produced can be steam sterilised by a conventional method or may be sterilised by other methods including UV sterilisation technique.

DK Measurement

DK Measurement (i.e., oxygen permeability) was carried out by the polarographic technique as briefly described below:

Ten lenses were placed into the Gallenkamp incubator set at 35+/−0.5° C. for 24 hours. The centre thickness (CT) of each of the ten lenses were measured by Rehder ET-3 Electronic Thickness Gauge and these lenses were stacked as follows: A single lens stack, two lens stack, three lens stack, and four lens stack. The CT of each stack was measured three times and a mean value for each was calculated and fed into a spread sheet specifically developed for the method. Also recorded was the atmospheric pressure into the spread sheet. The stack of lenses were replaced into the incubator set at 35+/−0.5° C. and humidity >98%.

Each stack was separately placed on to the electrode (Rehder Permeometer with 8.7 mm electrode) ensuring that there are no bubbles entrapped between the lenses and the electrode. When the current reached its lowest point the reading was recorded in the relevant section of the spread sheet. This test was repeated for all the stacks.

The dark current reading (background) of the measurement system, when no oxygen is able to pass through to the electrode, was recorded and subtracted from all test material current values. Data was analysed taking into consideration the partial pressure of oxygen and the surface area of the polarographic sensor used and finally corrected for the edge effect. A graph of Dk/t corr verses thickness (cm) was then plotted and the inverse of the gradient of the best fit taken to represent the permeability (DK) of the lens material.

Modulus Data

Modulus data was measured for contact lenses prepared in accordance with the invention by tensile testing using the Instron 5842 Tensile testing system with Merlin Software.

Correlation to Standards/Regulation: ISO 9001:2008 (Quality Standards: Par 7.6; ISO 13485:2003 Medical Device Directive: Par 7.6; FDA Part 820 QS Regulation Subpart G: Control of inspection, monitoring and test equipment 820.72.

Sample Preparation

Thickness readings for each lens were obtained using the ET-3 Thickness gauge. The lenses were placed flat on the cutting mat and two long pieces were cut from around the centre of the flat lens using a razor blade. These cut pieces were put into saline solution in a sample dish. The sample was loaded on to clamps using tweezers carefully going for the top clamp first and then the bottom. The gap in between the clamps was set at 10 mm using a calibrated vernier caliper. Once set, the "Reset GL" button was pressed to set the Gauge Length". Once the sample was loaded, the balance load was set to 0.000 N and the test was started using the console controls.

Table 1 shows examples of the presently claimed PEG Si-injection molded (PEG Si-IM) compositions. The UV transmission for compositions 4 and 5 at 550 nm was >95%.

Table 2 shows further examples of the presently claimed PEG Si-IM compositions.

Various modifications and variations of the described aspects of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes of carrying out the invention which are obvious to those skilled in the relevant fields are intended to be within the scope of the following claims.

TABLE 1

Examples for PEG-SiIM compositions based on silicone macromer 1580

| Composition | Wt of PEG 6088 (g) | Wt of PEG 3350 (g) | Wt of PEG 1000 (g) | Wt of TEG (g) | Wt of Silicone macromer 1580 (g) | Weight of Desmodur w (g) | Weight of DBTDL (g) | Wt of BHA (g) | Modulus (MPa) | DK (Barrer) | EWC (%) | Visual appearance of hydrated sample |
|---|---|---|---|---|---|---|---|---|---|---|---|---|
| 1 | 20.000 | | | 7.9060 | 10.0074 | 15.778 | 0.0416 | 0.0576 | | | | opaque |
| Wt % = | 37.18 | | | 14.69 | 18.60 | 29.33 | 0.0773 | 0.10 | | | | |
| Moles = | 3.2851 × 10⁻³ | | | 0.0526 | 6.3337 × 10⁻³ | 0.0601 | | | | | | |
| 2 | | 30.15 | | 14.069 | 14.1834 | 28.380 | 0.0527 | 0.1747 | | | 68.7 | |
| Wt % = | | 34.65 | | 16.17 | 16.30 | 32.61 | 0.06 | 0.20 | | | | |
| Moles = | | 9.0 × 10⁻³ | | 0.0937 | 8.9768 × 10⁻³ | 0.1081 | | | | | | |
| 3 | | | 30.33 | 13.56 | 14.1638 | 29.946 | 0.1000 | 0.1000 | | | | opaque |
| Wt % = | | | 34.39 | 15.37 | 16.05 | 33.95 | 0.11 | 0.11 | | | | |
| Moles = | | | 0.0303 | 0.0903 | 8.9644 × 10⁻³ | 0.1141 | | | | | | |
| 4. | | 30.48 | | 16.186 | 14.1421 | 33.316 | 0.0576 | 0.1863 | 0.46 +/− 0.02 | 87.6 | 63.7 | transparent |
| Wt % = | | 32.30 | | 17.15 | 14.98 | 35.30 | 0.06 | 0.20 | | | | |
| Moles = | | 9.0985 × 10⁻³ | | 0.1078 | 8.9506 × 10⁻³ | 0.1269 | | | | | | |
| 5. | | 30.00 | | 16.1657 | 28.2666 | 35.103 | 0.0705 | 0.2238 | 0.39 +/− 0.01 | 77.9 | 75.2 | transparent |
| Wt % = | | 27.39 | | 14.75 | 25.80 | 32.04 | 0.06 | 0.20 | | | | |
| Moles = | | 8.9552 × 10⁻³ | | 0.1076 | 17.89 × 10⁻³ | 0.1337 | | | | | | |

TABLE 2

Examples for PEG-SiIM compositions based on silicone macromer DBE C25
(M wt = 3500 to 4500 = ~4000 mean)

| Composition | Wt of PEG 3350 (g) | Wt of PEG 1000 (g) | Wt of PEG 1500 (g) | Wt of PEG 600 (g) | Wt of TEG (g) | Wt of Silicone macromer (DBEC25) (g) | Weight of Desmodur w (g) |
|---|---|---|---|---|---|---|---|
| 1 | | | | 10.073 | 12.751 | 6.672 | 26.279 |
| Wt % = | | | | 17.83 | 22.57 | 11.80 | 46.51 |
| Moles = | | | | 0.0167 | 0.0849 | 1.668 × 10⁻³ | 0.1001 |
| 2 | | | | 10.020 | 25.041 | 6.673 | 48.276 |
| Wt % = | | | | 10.98 | 27.46 | 7.32 | 52.94 |
| Moles = | | | | 0.00167 | 0.1667 | 1.668 × 10⁻³ | 0.1839 |
| 3 | | | | 5.118 | 18.784 | 3.363 | 35.074 |
| Wt % = | | | | 8.10 | 29.73 | 5.32 | 55.53 |
| Moles = | | | | 0.0085 | 0.1250 | 8.4 × 10⁻⁴ | 0.1336 |
| 4 | | | | 5.018 | 25.076 | 3.334 | 45.940 |
| Wt % = | | | | 6.24 | 31.17 | 4.14 | 57.10 |

TABLE 2-continued

Examples for PEG-SiIM compositions based on silicone macromer DBE C25
(M wt = 3500 to 4500 = ~4000 mean)

| | | | | | | |
|---|---|---|---|---|---|---|
| Moles = 5 | | | 0.0084 | 0.1669 | 8.33 × 10⁻⁴ | 0.1750 |
| Wt % = | | 10.0162 | | 15.0408 | 8.1160 | 28.954 |
| Moles = 6 | | 15.91 | | 23.89 | 12.89 | 46.00 |
| Wt % = | | 0.0100 | | 0.1001 | 2.3 × 10⁻³ | 0.1103 |
| Moles = 7 | | 10.0465 | | 22.5694 | 8.1787 | 42.022 |
| Wt % = | | 11.97 | | 26.89 | 9.74 | 50.07 |
| Moles = 8 | | 0.0100 | | 0.1503 | 2.04 × 10⁻³ | 0.1600 |
| Wt % = | | 10.0177 | | 30.0754 | 8.0696 | 55.307 |
| Moles = 9 | | 9.56 | | 28.69 | 7.70 | 52.77 |
| Wt % = | | 0.0100 | | 0.2002 | 2.02 × 10⁻³ | 0.2107 |
| Moles = 10 | | | 10.264 | 20.2309 | 5.3382 | 36.807 |
| Wt % = | | | 13.95 | 27.49 | 7.25 | 50.02 |
| Moles = 11 | | | 6.84 × 10⁻³ | 0.1347 | 1.33 × 10⁻³ | 0.1402 |
| Wt % = | 5.02 | 5.1 | | 10.3678 | 7.3770 | 19.313 |
| Moles = | 10.52 | 10.69 | | 21.73 | 15.46 | 40.48 |
| | 1.5 × 10⁻³ | 5.1 × 10⁻³ | | 0.0690 | 1.84 × 10⁻³ | 0.0735 |
| | 25.04 | 25.43 | | 69.06 | 36.90 | 129.38 |
| | 8.48 | 8.61 | | 23.40 | 12.50 | 43.84 |
| | 7.4 × 10⁻³ | 0.0254 | | 0.4598 | 9.2 × 10⁻³ | 0.4928 |
| | 15.00 | 35.04 | | 69.08 | 36.88 | 128.00 |
| | 5.11 | 11.94 | | 23.55 | 12.57 | 43.63 |
| | 4.5 × 10⁻³ | 0.0350 | | 0.4600 | 9.2 × 10⁻³ | 0.4876 |

| Composition | Weight of DBTDL (g) | Wt of BHA (g) | Wt of RB4 (g) | PEG Dme 1000 (g) | EWC (%) | Visual appearance of hydrated sample |
|---|---|---|---|---|---|---|
| 1 | 0.1671 | 0.5546 | | | 31.2 | opaque |
| Wt % = | 0.29 | 0.98 | | | | |
| Moles = | | | | | | |
| 2 | 0.2783 | 0.8971 | | | 22.5 | Transparent |
| Wt % = | 0.30 | 0.98 | | | | |
| Moles = | | | | | | |
| 3 | 0.2008 | 0.6225 | | | 4.5 | Transparent |
| Wt % = | 0.32 | 0.98 | | | | |
| Moles = | | | | | | |
| 4 | 0.2917 | 0.7926 | | | 2.8 | Transparent |
| Wt % = | 0.36 | 0.98 | | | | |
| Moles = | | | | | | |
| 5 | 0.1976 | 0.6192 | | | 44.6 | opaque |
| Wt % = | 0.31 | 0.98 | | | | |
| Moles = | | | | | | |
| 6 | 0.2797 | 0.8224 | | | 34.1 | Transparent |
| Wt % = | 0.33 | 0.98 | | | | |
| Moles = | | | | | | |
| 7 | 0.3144 | 1.0148 | | | 33.4 | Transparent |
| Wt % = | 0.30 | 0.97 | | | | |
| Moles = | | | | | | |
| 8 | 0.2179 | 0.7240 | | | 39.3 | Transparent |
| Wt % = | 0.29 | 0.98 | | | | |
| Moles = | | | | | | |
| 9 | 0.1252 | 0.4006 | | | | Tyndall |
| Wt % = | 0.26 | 0.84 | | | | |
| Moles = | | | | | | |
| 10 | 0.5932 | 2.8496 | 0.0882 | 5.7834 | 47.5 | Transparent |
| Wt % = | 0.20 | 0.96 | | | | |
| Moles = | | | | | | |
| 11 | 0.5713 | 2.9038 | 0.0845 | 5.8000 | | Transparent |
| Wt % = | 0.19 | 0.99 | 0.03 | 1.98 | | |
| Moles = | | | | | | |

The invention claimed is:

1. A polyurethane xerogel prepared from a mixture comprising:

(a) at least one polyethylene glycol having a molecular weight of 1,000 to 50,000;

(b) at least one di-isocyanate;

(c) at least one polydialkyl siloxane diol; and (d) at least one diol of formula I

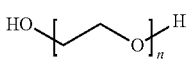

wherein n is an integer from 1 to 10;

wherein the polyethylene glycol, di-isocyanate, polydialkyl siloxane diol and diol are reacted under substantially anhydrous conditions.

2. A polyurethane xerogel according to claim 1 wherein the di-isocyanate is an aliphatic di-isocyanate.

3. A polyurethane xerogel according to claim 1 wherein the di-isocyanate is of the formula $OCN-R_1-NCO$, wherein $R_1$ is a linear or branched $C_3$-$C_{18}$-alkylene, a $C_3$-$C_8$-cycloalkylene, a $C_3$-$C_8$-cycloalkylene-$C_1$-$C_6$-alkylene, a $C_3$-$C_8$-cycloalkylene-$C_1$-$C_6$-alkylene-$C_3$-$C_8$-cycloalkylene or a $C_1$-$C_6$-alkylene-$C_3$-$C_8$-cyclo-alkylene-$C_1$-$C_6$-alkylene.

4. A polyurethane xerogel according to claim 1 wherein the di-isocyanate is methylene bis(4-cyclohexyl isocyanate).

5. A polyurethane xerogel according to claim 1 wherein the diol is triethylene glycol (TEG).

6. A polyurethane xerogel according to claim 1 wherein the diol is diethylene glycol (DEG).

7. A polyurethane xerogel according to claim 1 wherein the diol is according to formula I and n is an integer from 2 to 10.

8. A polyurethane xerogel according to claim 1 wherein the diol is tetraethylene glycol (TTEG).

9. A polyurethane xerogel according to claim 1 wherein the polydialkyl siloxane diol is carbinol terminated.

10. A polyurethane xerogel according to claim 9 wherein the polydialkyl siloxane diol is of formula V, Formula V

[Chemical structure: HO-[CH2CH2O]p-[CH2]3-Si(R)(R)-O-[Si(R)(R)-O]x-Si(R)(R)-[CH2]3-[OCH2CH2]p-OH]

wherein R is alkyl, p is an integer from 1 to 110, and x is an integer from 1 to 324.

11. A polyurethane xerogel according to claim 10 wherein the polydialkyl siloxane diol of formula V is prepared by reacting a polydialkyl siloxane hydride terminated of formula III with an allyl polyglycol of formula IV

[Chemical structures: Formula III: H-Si(R)(R)-O-[Si(R)(R)-O]x-Si(R)(R)-H ; Formula IV: CH2=CH-CH2-[OCH2CH2]p-OH]

Formula III    Formula IV

↓

[Chemical structure: HO-[CH2CH2O]p-[CH2]3-Si(R)(R)-O-[Si(R)(R)-O]x-Si(R)(R)-[CH2]3-[OCH2CH2]p-OH.]

Formula V

12. A polyurethane xerogel according to claim 9 wherein the polydialkyl siloxane diol is of Formula VI:

[Chemical structure: HO-[(CH2)_A-C(=O)-O]p-Y-Si(R)(R)-O-[Si(R)(R)-O]x-Si(R)(R)-Y-[O-C(=O)-(CH2)_A]p-OH]

wherein R represents a small alkyl group, Y represents an alkyl group, p is an integer from 1 to 110, x is an integer from 1 to 324, and A is an integer from 1 to 25.

13. A polyurethane xerogel according to claim 1 wherein the mixture further comprises one or more antioxidants.

14. A polyurethane xerogel according to claim 13 wherein the mixture comprises 1 to 3 wt % antioxidant.

15. A polyurethane xerogel according to claim 1 wherein the mixture further comprises a catalyst.

16. A polyurethane xerogel according to claim 15 wherein the catalyst is a transition metal catalyst, an amine or a polyamine.

17. A polyurethane xerogel according to claim 16 wherein the catalyst is selected from dibutyltin dilaurate, $FeCl_3$, stannous octoate, and triethylamine.

18. A polyurethane xerogel according to claim 1 wherein the mixture further comprises one or more tinting agents.

19. A polyurethane xerogel according to claim 1 wherein the mixture further comprises one or more UV blockers.

20. A polyurethane xerogel according to claim 1 wherein the mixture further comprises one or more of a modulus modifier, a plasticizer, a humectant and a lubricant.

21. A polyurethane hydrogel comprising the polyurethane xerogel of claim 1 in hydrated form.

22. A process for preparing a polyurethane xerogel, said process comprising:
(i) preparing a mixture comprising at least one polyethylene glycol having a molecular weight of 1,000 to 50,000, at least one di-isocyanate, at least one polydialkyl siloxane diol and at least one diol of formula I,

[Chemical structure: HO-[CH2CH2O]n-H]    I wherein n is an integer from 1 to 10; and (ii) reacting the mixture formed in step (i) under substantially anhydrous conditions to form a polyurethane xerogel.

23. A polyurethane xerogel obtained by the process of claim 22.

24. A process for preparing a polyurethane hydrogel, said process comprising preparing a polyurethane xerogel accord ing to claim 22, and hydrating said polyurethane xerogel with an aqueous medium to form a polyurethane hydrogel.

25. A polyurethane hydrogel obtained by the process of claim 24.

26. A contact lens comprising the polyurethane xerogel of claim 1.

27. A polyurethane xerogel according to claim 1, wherein n is an integer from 1 to 4.

28. A polyurethane xerogel prepared from a mixture comprising:
(a) at least one polyethylene glycol having a molecular weight of 1,000 to 50,000;
(b) at least one di-isocyanate;
(c) at least one carbinol terminated polydialkyl siloxane diol; and
(d) at least one diol of formula I

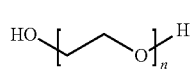
I wherein n is an integer from 1 to 25;
wherein the polyethylene glycol, di-isocyanate, polydialkyl siloxane diol and diol are reacted under substantially anhydrous conditions.

29. A polymer according to claim 28 wherein the polydialkyl siloxane diol is of Formula VI:

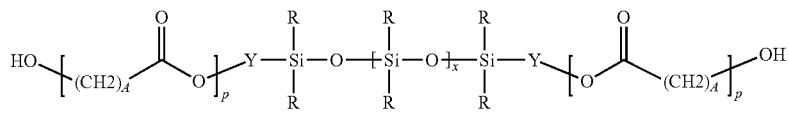

wherein R represents a small alkyl group, Y represents an alkyl group, p is an integer from 1 to 110, x is an integer from 1 to 324, and A is an integer from 1 to 25.

* * * * *